United States Patent
Han et al.

(10) Patent No.: US 7,356,006 B2
(45) Date of Patent: Apr. 8, 2008

(54) METHOD OF OVERHEAD CHANNEL TRANSMISSION IN MOBILE COMMUNICATION SYSTEM AND APPARATUS USING THE SAME

(75) Inventors: Kyoo Jin Han, Anyang-si (KR); Ki Jun Kim, Seoul (KR); Sang Woo Lee, Seoul (KR); Young Woo Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 667 days.

(21) Appl. No.: 10/842,562

(22) Filed: May 11, 2004

(65) Prior Publication Data

US 2004/0228306 A1    Nov. 18, 2004

(30) Foreign Application Priority Data

May 12, 2003  (KR) ............... 10-2003-0029827

(51) Int. Cl.
*H04B 7/216*        (2006.01)

(52) U.S. Cl. ............... 370/335; 370/208; 370/342; 375/130

(58) Field of Classification Search ............ 370/208, 370/342, 320, 335; 375/130

See application file for complete search history.

(56) References Cited

U.S. PATENT DOCUMENTS 5,930,230 A  *  7/1999  Odenwalder et al. ....... 370/208
6,721,349 B1 *  4/2004  Willenegger et al. ....... 375/130

* cited by examiner

*Primary Examiner*—Jean Gelin
*Assistant Examiner*—Phuoc Doan
(74) *Attorney, Agent, or Firm*—Ked & Associates, LLP

(57) ABSTRACT

A method of performing a reverse-link packet data service in a communication system is provided, by which a reverse packet data service is available at a high data rate in the reverse link supporting a variable data rate without additional Walsh code allocation. The method includes steps of transmitting a plurality of traffic packet frames on a first channel, each traffic packet frame having a data rate; transmitting a plurality of main pilots on a second channel; transmitting a plurality of auxiliary pilots on a third channel, each auxiliary pilot corresponding to one traffic packet frame; and transmitting data rate information on a fourth channel, the data rate information indicating the respective data rates of the traffic packet frames, wherein the transmissions on the third and fourth channels are alternated by a time division of one Walsh code. A communication system adopting the method includes a base station for transmitting a plurality of reverse activity bits for a plurality of traffic packet frames to at least one mobile terminal, each traffic packet frame having a data rate, the at least one mobile terminal determining a plurality of reverse rate indicators of the respective data rates of the traffic packet frames using the corresponding reverse activity bits, each reverse rate indicator determining the data rate of the next traffic packet frame.

10 Claims, 3 Drawing Sheets

METHOD OF OVERHEAD CHANNEL TRANSMISSION IN MOBILE COMMUNICATION SYSTEM AND APPARATUS USING THE SAME

CROSS-REFERENCE TO RELATED APPLICATIONS

This application claims the benefit of Korean Application No. 10-2003-0029827 filed on May 12, 2003, which is hereby incorporated by reference.

BACKGROUND OF THE INVENTION

1. Field of the Invention

The present invention relates to mobile communications, and more particularly, to a method of transmitting an overhead for a reverse packet data service in a CDMA system and to an apparatus using the same, in which, for each reverse traffic packet frame, an auxiliary pilot signal and a reverse rate indicator are alternately transmitted by a time division of one Walsh code.

2. Discussion of the Related Art

Though developed later than the TDMA system, the CDMA system has been more widely adopted and now prevails in terms of service area, but a rapidly increasing demand for packet data services has called for an update to the system standard, which was initially intended for voice and other serial data applications. The evolution of the CDMA system is ongoing and includes the standardization of the forward link, which was completed in 2002, with the standardization of the reverse link continuing into 2003. The new forward-link standard enabled high-speed packet data services through the introduction of new techniques, such as dividing a baseband frame into subpackets and applying a hybrid automatic repeat request (HARQ) transmission scheme. These techniques are similarly applicable in the reverse link, that is, in the mobile terminal.

In one example of reverse-link standardization—namely, a first evolution, data only (1xEV-DO) system—the mobile terminal determines the reverse data rate for each packet, which is divided into subpackets to be transmitted via multiple transmissions using the HARQ transmission scheme, and handles the data rate information using a control channel. In the reverse link of the 1xEV-DO system, a mobile terminal refers to a reverse activity bit (RAB) received from a base station to determine the data rate of the next baseband frame and, together with a reverse pilot signal, transmits a reverse rate indicator (RRI) for each baseband frame, i.e., each packet of reverse traffic data. The base station uses the reverse pilot signal in the detection of the data rate information, i.e., the RRI, which enables recognition of the data rate of the corresponding packet, so that the base station may perform decoding. Successful decoding requires a minimum pilot signal strength, which varies according to the data rate of the packet data corresponding to the pilot signal transmission, increasing for higher rates and decreasing for lower rates. The transmitted pilot signal, however, should allow for the maximum reverse data rate under 1xEV-DO specifications (153.6 kbps) so that a closed loop power control of the reverse link may proceed normally. That is, the same pilot signal transmission occurs regardless of the data rate—high or low—of the corresponding is packet transmission, to permit decoding at all transmittable data rates. The result is at least some degree of waste of pilot signal transmission power for any reverse-link packet data rate lower than the 153.6 kbps maximum.

FIG. 1 illustrates an exemplary reverse-link transmission in a 1xEV-DO system according to a related art, showing a pilot signal having a constant signal strength transmitted together with traffic data having a data rate varying for each frame. Thus, the transmitted pilot signal has a signal strength enabling the decoding of a 153.6 kbps traffic data packet and disregarding the potential for packet data transmission at a lower data rate, such that there is a waste of reverse pilot power when a traffic data packet is transmitted at any data rate lower than the maximum. Here, the varying data rate of the traffic data packets is represented as a variation in vertical dimension of the respective frames as depicted, to indicate more data transfer when transmitting at higher rates.

In the 1xEV-DO system adopting the method of FIG. 1, a reverse link baseband can be implemented while simplifying the associated power control and supporting the maximum data rate. Any waste of the pilot signal transmission power could be considered to have little consequence, even if the traffic data rate is much lower than 153.6 kbps. The potential for waste, however, greatly increases when applying a hybrid automatic repeat request (HARQ) transmission scheme, which permits reverse-link data rates of up to 1 Mbps. In this case, the waste can no longer be ignored since the strength of the pilot signal should be high enough to enable the decoding of the traffic packet at the highest data rate.

FIG. 2 illustrates an exemplary reverse-link transmission in which a pilot signal having an optimally set signal strength is transmitted together with traffic data having a varying data rate, showing an ideal case where a separate pilot signal strength is set for each change in data rate. The signal strength of such a pilot signal, however, would need to be variable for any subframe of reverse traffic data, which is unworkable since detection of the current reverse data rate is required before performing any power control in a closed loop power control block. To solve this, the signal of the pilot channel may be divided for simultaneous transmission via an auxiliary pilot channel and a main pilot channel, as shown in FIG. 3, whereby high-data-rate packet decoding can be achieved using the auxiliary pilot and low-data-rate packet decoding can be achieved using the main pilot, which supports closed loop power control. Such division of the pilot channel, however, necessitates allocation of a second Walsh code for use in the auxiliary pilot channel, and the resulting level of complexity represents an unreasonable exchange for saving small amounts of transmit power.

SUMMARY OF THE INVENTION

Accordingly, the present invention is directed to a method and apparatus for overhead channel transmission that substantially obviates one or more of the problems due to limitations and disadvantages of the related art.

An object of the present invention, which has been devised to solve the foregoing problem, lies in providing a method of performing a reverse-link packet data service in a communication system, in which the allocation of an additional Walsh code is unnecessary.

It is another object of the present invention to provide a method of performing a reverse-link packet data service in a communication system, by which a reverse packet data service is available at a high data rate in the reverse link supporting a variable data rate without additional Walsh code allocation.

It is another object of the present invention to provide a method of performing a reverse-link packet data service in a communication system, by which transmission of a divided pilot channel is simplified.

It is another object of the present invention to provide a method of performing a reverse-link packet data service in a communication system, which employs a single Walsh code in utilizing a main pilot channel and an auxiliary pilot channel for conserving reverse pilot signal transmit power.

It is another object of the present invention to provide a communication system adopting a method of performing a reverse-link packet data service, which conserves reverse pilot signal transmit power while providing a reverse packet data service at a low data rate in the reverse link supporting a variable data rate.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method of performing a reverse-link packet data service in a communication system. The method comprises steps of transmitting a plurality of traffic packet frames on a first channel, each traffic packet frame having a data rate; transmitting a plurality of main pilots on a second channel; transmitting a plurality of auxiliary pilots on a third channel, each auxiliary pilot corresponding to one traffic packet frame; and transmitting data rate information on a fourth channel, the data rate information indicating the respective data rates of the traffic packet frames, wherein the transmissions on the third and fourth channels are alternated by a time division of one Walsh code. Here, the auxiliary pilots are transmitted in an auxiliary pilot channel for supplementing pilot power that may be insufficient for transmitting a traffic packet frame of the traffic packet frames, and the data rate information of the fourth channel includes reverse rate indicators.

According to the present invention, another arbitrary channel signal (i.e., the fourth channel) is inserted in the auxiliary pilot channel in the reverse link by time division. The auxiliary pilot channel is arranged so that the corresponding packet traffic channel shares a central time axis, such that corresponding auxiliary pilots and packet traffic frames each have symmetry with respect to the central time axis. Thus, the data rate information of a traffic packet frame precedes the corresponding auxiliary pilot, and the transmission of data rate information leads the corresponding traffic packet frame by one half of a field length.

In another aspect of the present invention, there is provided a method of performing a reverse-link packet data service in a communication system including a base station and a mobile terminal. The method comprises steps of transmitting, from the base station to the mobile terminal, a reverse activity bit for each of a plurality of traffic packet frames, each traffic packet frame having a data rate; determining, in the mobile terminal, a reverse rate indicator for each traffic packet frame based on the reverse activity bits, each reverse rate indicator determining the data rate of the next traffic packet frame; and respectively transmitting the information respectively transmitted on the above-mentioned first through fourth channels. There is also provided a mobile communication system comprising means for performing the above transmitting and determining steps and means for receiving the information respectively transmitted on the first through fourth channels.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Throughout the drawings, like elements are indicated using the same or similar reference designations.

An overhead channel according to the present invention is transmitted for a reverse packet data service. The overhead channel includes a reverse-link pilot channel and a reverse-link control channel. Proposed as an overhead channel transmitting method is a method enabling an auxiliary pilot channel without additional Walsh code allocation.

Figure 1:
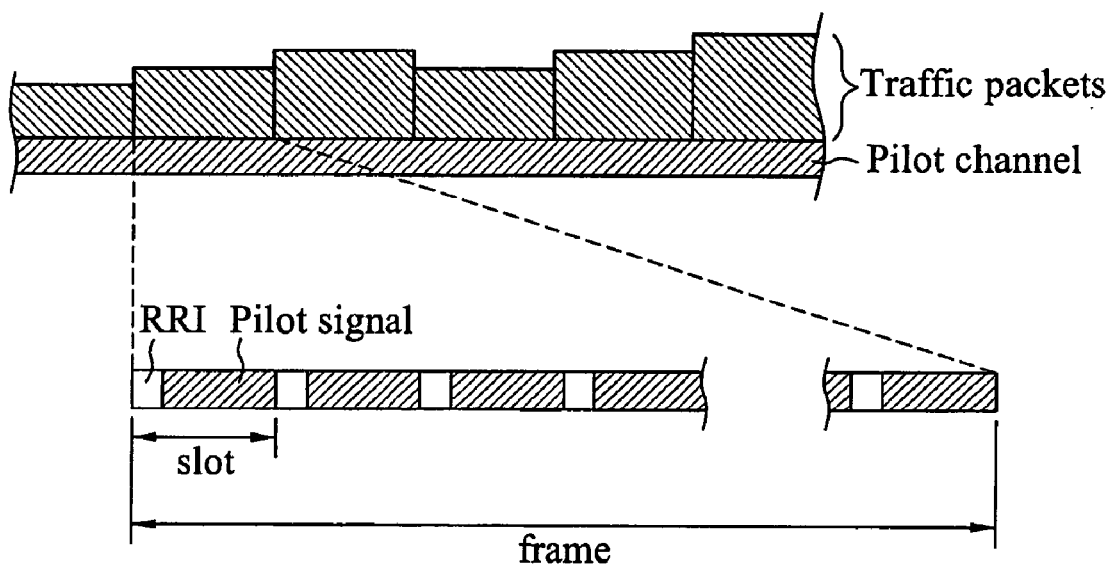
FIG. 1 is a diagram of an exemplary reverse-link transmission in a 1xEV-DO system according to a related art.
Figure 2:
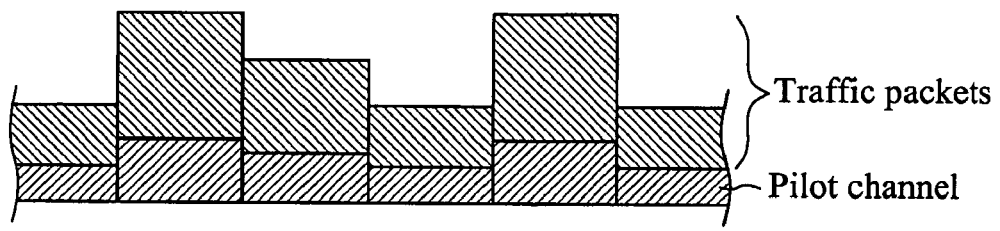
FIG. 2 is a diagram of an exemplary reverse-link transmission in a 1xEV-DO system according to a related art, in which a pilot signal having an optimally set signal strength is transmitted together with traffic data having a similarly varying data rate.
Figure 3:
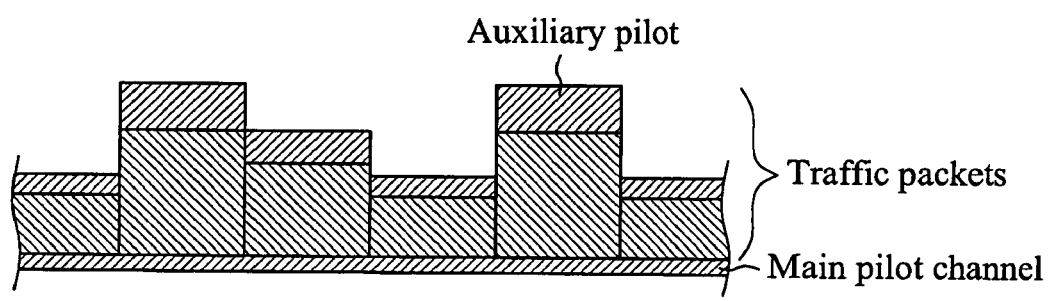
FIG. 3 is a diagram of an exemplary reverse-link transmission, in which the pilot channel in FIG. 2 is divided into a main pilot channel and an auxiliary pilot channel.

Similar to that of the 1xEV-DO system of FIG. 3, the main pilot signal of the present invention is primarily responsible for traffic packet decoding at low data rates and for closed loop power control in the reverse link. According to the present invention, the signal strength of a main pilot signal enables normal decoding of packet data at data rates of 19.2 kbps and below (e.g., 9.6 kbps). Thus, since the pilot signal of the present invention is transmitted at a signal strength insufficient for data rates exceeding 19.2 kbps, the method of the present invention provides for additional pilot signal transmission via an auxiliary pilot channel.

Figure 4:
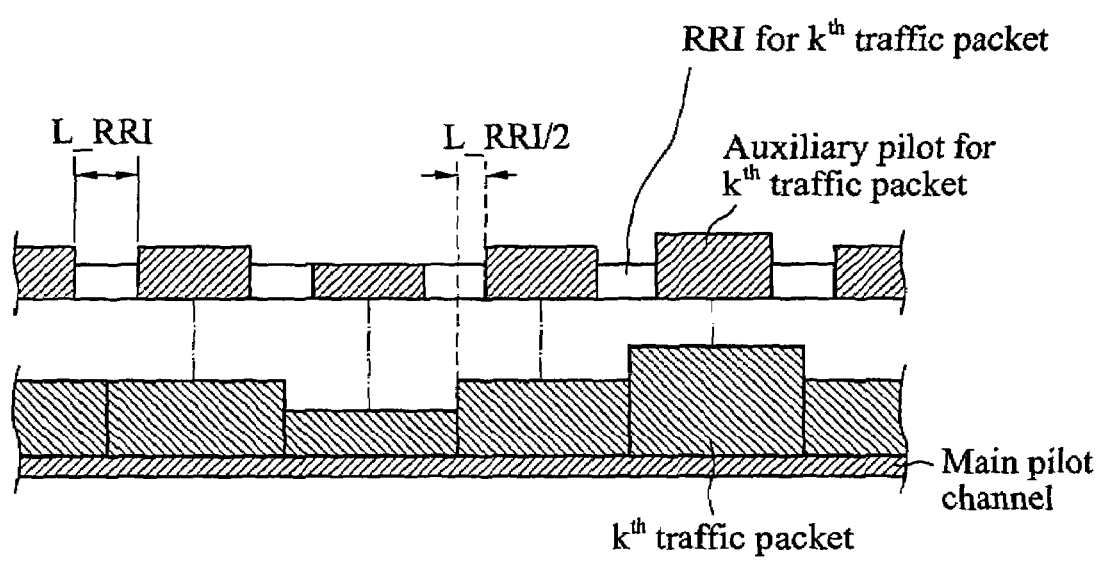
FIG. 4 is a diagram of an exemplary reverse-link transmission in a 1xEV-DO system adopting the method of the present invention.

FIG. 4 illustrates a method of transmitting an overhead channel for a packet data service in the reverse link of a mobile communication system adopting the present invention. In the event that the reverse data rate necessitates use of the auxiliary pilot signal to supplement pilot signal power for a corresponding traffic packet, the method of the present invention adopts the use of a reverse rate indicator (RRI) channel using a time division of one Walsh code. The RRI channel, with auxiliary pilot signal, is shown in FIG. 4 juxtaposed to a corresponding transmission of traffic data packets with the main pilot channel.

As shown in FIG. 4, corresponding ($k^{th}$) frames of the auxiliary pilot signal and traffic packets are centered on the same time point and exhibit a symmetry about a central time axis. This correspondence is achieved by a relative shift between the respective transmissions, such that the reverse rate indicator RRI information leads its corresponding traffic packet by one half the field length of the RRI channel, or one half the reverse rate indicator (L_RRI), to begin its transmission prior to that of the traffic packet. Thus, the lead time is equal to L_RRI/2. Similarly, there is an RRI field length of L_RRI/2 following the auxiliary pilot for each traffic packet frame. With the reverse rate indicator thus inserted in the auxiliary pilot signal by time division, a symmetry of frames between the auxiliary pilot signal and the corresponding traffic packet is maintained.

Although the above-described L_RRI/2 shift is preferred to achieve a desirable lead time of the RRI channel with respect to a correspond traffic packet, other shifts may be utilized. For example, the lead time may be set to L_RRI/3, L_RRI/4, etc.

According to the present invention, one Walsh cover resource is shared by the control channel RRI and the auxiliary pilot signal, such that the allocation of an additional Walsh code is unnecessary. Furthermore, by adopting the present invention, the data rate of the traffic packet can be recognized during the lead time of one half length (L_RRI/2) of the control channel field, allowing the mobile terminal to determine whether to apply an interference removal function to the traffic packet, obviating the need to store a reception signal for the interference removal function. In addition, since the auxiliary pilot signal is received after RRI detection, the signal strength of the auxiliary pilot signal can be estimated using an RRI-T/P table, enabling use of the auxiliary pilot signal in reverse-link power control.

The lengths of the traffic packet, RRI field, and auxiliary pilot signal are preferably set to ten slots, two slots, and eight slots, based on a 1.67 ms slot. In doing so, time diversity gain is unattainable since the RRI is transmitted during such a short cycle, which is in contrast to the time diversity gain achieved by a channel structure of a transmission throughout the entire length of the traffic packet frame. Nevertheless, since the RRI is previously detected to use the entire auxiliary pilot signal for power control, the lack of a time diversity gain can be easily compensated by a more precise power control.

Accordingly, the present invention enables the establishment of an efficient overhead channel for the packet data service supporting the variable data rate in the reverse link. The present invention transmits the RRI and the auxiliary pilot signal using one Walsh code such that no additional Walsh code allocation is needed. The present invention previously detects the RRI prior to the reception of the auxiliary pilot signal and the corresponding traffic packet data, thereby enabling a utilization of the auxiliary pilot signal in power control and to cope with the expected application of an interference removal function.

It will be apparent to those skilled in the art that various modifications and variations can be made in the present invention without departing from the spirit or scope of the invention. Thus, it is intended that the present invention embody such modifications and variations, provided they come within the scope of the appended claims and their equivalents.

What is claimed is:

1. A method of performing a reverse-link packet data service in a communication system, the method comprising:
    transmitting a plurality of traffic packet frames on a first channel, each traffic packet frame having a data rate;
    transmitting a plurality of main pilots on a second channel;
    transmitting a plurality of auxiliary pilots on a third channel, each auxiliary pilot corresponding to one traffic packet frame; and
    transmitting data rate information on the third channel, the data rate information indicating the respective data rates of the traffic packet frames, wherein each auxiliary pilot and data rate information corresponding to one traffic packet frame are transmitted alternately by using time division multiplexing on the third channel using one Walsh code.

2. The method as claimed in claim 1, wherein the auxiliary pilots are transmitted on the third channel for supplementing pilot power that may be insufficient for transmitting a traffic packet frame of the traffic packet frames.

3. The method as claimed in claim 1, wherein the main pilot has a signal strength enabling a decoding of the traffic packet frames having a low data rate.

4. The method as claimed in claim 3, wherein the low data rate is not greater than 19.2 kbps.

5. The method as claimed in claim 1, wherein the auxiliary pilot has a signal strength corresponding to the respective data rates of the traffic packet frames.

6. The method as claimed in claim 1, wherein the data rate information of a traffic packet frame precedes the corresponding auxiliary pilot.

7. The method as claimed in claim 6, wherein said transmission of data rate information leads the corresponding traffic packet frame by one half of a field length.

8. The method as claimed in claim 1, wherein corresponding auxiliary pilots and traffic packet frames share a central time axis and each have symmetry with respect to the central time axis.

9. A method of performing a reverse-link packet data service in a communication system including a base station and a mobile terminal, the method comprising:
    transmitting, from the base station to the mobile terminal, a reverse activity bit for each of a plurality of traffic packet frames, each traffic packet frame having a data rate;
    determining, in the mobile terminal, a reverse rate indicator for each traffic packet frame based on the reverse activity bits, each reverse rate indicator determining the data rate of the next traffic packet frame; and
    respectively transmitting a plurality of traffic packet frames on a first channel, each traffic packet frame having a data rate; a plurality of main pilots on a second channel; a plurality of auxiliary pilots on a third channel, each auxiliary pilot corresponding to one traffic packet frame; and data rate information on the third channel, the data rate information indicating the respective data rates of the traffic packet frames, wherein each auxiliary pilot and data rate information corresponding to one traffic packet frame are transmitted alternately by using time division multiplexing on the third channel using one Walsh code.

10. The method as claimed in claim 9, further comprising steps of:
    detecting, in the base station, each reverse rate indicator using the corresponding main pilots and auxiliary pilots;
    recognizing, using the detected reverse rate indicator, the data rate of the corresponding traffic packet frame; and
    decoding, using the recognized data rate, the corresponding traffic packet frame.

* * * * *